(12) United States Patent
Hudson (10) Patent No.: US 7,406,299 B1
(45) Date of Patent: Jul. 29, 2008

(54) WIRELESS COMMUNICATIONS METHOD, SYSTEM AND TERMINAL THEREFOR UTILISING A PLURALITY OF SIMULTANEOUS, DATA BEARING, COMMUNICATIONS LINKS FOR CONVEYING DATA BETWEEN A PLURALITY OF BASE STATIONS AND A TERMINAL

(75) Inventor: John E Hudson, Stansted (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1969 days.

(21) Appl. No.: 09/688,557

(22) Filed: Oct. 16, 2000

Related U.S. Application Data (63) Continuation-in-part of application No. 09/419,211, filed on Oct. 15, 1999, now abandoned.

(51) Int. Cl.
*H04B 1/02* (2006.01)
(52) U.S. Cl. .................. 455/103; 455/426.1; 455/452.1
(58) Field of Classification Search ...... 455/450–452.2, 455/560, 561, 426.1, 101, 103, 132, 193.1; 370/328, 329, 331, 338
See application file for complete search history.

(56) References Cited

U.S. PATENT DOCUMENTS

| | | | | |
|---|---|---|---|---|
| 4,805,167 A | * | 2/1989 | Leslie et al. ................. | 370/540 |
| 5,379,447 A | * | 1/1995 | Bonta et al. .................. | 455/437 |
| 5,585,850 A | * | 12/1996 | Schwaller .............. | 375/240.01 |
| 5,793,744 A | * | 8/1998 | Kanerva et al. ............. | 370/209 |
| 5,966,374 A | * | 10/1999 | Rasanen ...................... | 370/337 |
| 6,009,124 A | * | 12/1999 | Smith et al. .................. | 375/267 |
| 6,038,453 A | * | 3/2000 | Kuo et al. .................... | 455/446 |
| 6,061,733 A | * | 5/2000 | Bodin et al. ................. | 709/233 |
| 6,243,367 B1 | * | 6/2001 | Hussain ...................... | 370/329 |
| 6,333,926 B1 | * | 12/2001 | Van Heeswyk et al. ..... | 370/335 |
| 6,363,263 B1 | * | 3/2002 | Reudink et al. .......... | 455/562.1 |
| 6,449,290 B1 | * | 9/2002 | Willars et al. ............... | 370/507 |
| 6,483,817 B1 | * | 11/2002 | Antonio et al. ............. | 370/328 |
| 6,487,402 B1 | * | 11/2002 | Faus et al. ................... | 455/411 |
| 2002/0027890 A1 | * | 3/2002 | Bernstein et al. ............ | 370/331 |
| 2002/0036999 A1 | * | 3/2002 | Bi et al. ...................... | 370/342 |

FOREIGN PATENT DOCUMENTS

WO    WO 95/31878    * 11/1995

* cited by examiner

*Primary Examiner*—William Trost
*Assistant Examiner*—James D Ewart
(74) *Attorney, Agent, or Firm*—Barnes & Thornburg LLP (57) ABSTRACT

Capacity of radio links in an in-building cellular communication system is currently limited by bandwidth available for a communications link between a terminal and a single base station. The present invention mitigates this limitation by permitting the terminal to establish a number of communications links with a number of base stations. Content data is distributed in parallel over the number of communications links.

46 Claims, 6 Drawing Sheets

WIRELESS COMMUNICATIONS METHOD, SYSTEM AND TERMINAL THEREFOR UTILISING A PLURALITY OF SIMULTANEOUS, DATA BEARING, COMMUNICATIONS LINKS FOR CONVEYING DATA BETWEEN A PLURALITY OF BASE STATIONS AND A TERMINAL

This application is a continuation-in-part of U.S. patent application Ser. No. 09/419,211; Filed: Oct. 15, 1999 now abandoned.

BACKGROUND OF THE INVENTION

1. Field of the Invention

This present invention relates to a wireless communications system for the communication of content data, the system being of the type used to support Wireless Local Area Networks (WLANs), for example, a cellular communications system. The present invention also relates to a method of communicating content data in the wireless communications system.

2. Background of the Invention

A cellular communications network usually comprises one or more Base Station Transceivers (BTS). Mobile and fixed subscriber stations located in the cellular communications network communicate with the one or more BTS, for example, a closest BTS. Each of the one or more BTS has a limited range corresponding to a geographical region over which the BTS is intended to operate effectively, the geographic region being known as a "cell". The geographic region can be further supported in regions of poor radio coverage and/or high demand by sub-cells having a radius in the region of 100-400 meters and known as micro-cells. Where smaller areas of coverage are required, for example inside buildings, the sub-cells can have a radius in the region of 50-100 meters, known as pico-cells. The micro-, or pico-cells can provide overlapping coverage for the geographical region. In an in-building communications system, for example a WLAN, the mobile and fixed subscriber stations (hereinafter referred to as the terminals) communicate with WLAN BTSs. Typically, there are more WLAN base stations per terminal than BTSs per terminal in the cellular communication networks, because the WLAN base stations have respectively smaller coverage areas and there is a need to compensate for blocked or reduced signal propagation caused by internal walls of the buildings. Indeed, the internal walls act as signal reflectors.

In cellular communications systems, including WLANs, each terminal is arranged to communicate with a single base station; in the case described above the single base station is the closest BTS. Each terminal communicating with a given BTS requires a certain amount of bandwidth to operate, a total amount of the bandwidth of the given BTS being limited. Consequently, a total number of terminals capable of communicating with the given BTS is limited.

Additionally, increases in bandwidth requirements, either through an increase in the total number of terminals needing to communicate with the given BTS, or through needs of individual terminals to support more sophisticated or better services, for example high data rates, can be dealt with over a long time frame by, for example, installing new BTSs and splitting cells. Although the number of cells increases, the provision of additional BTSs or splitting cells is expensive, requires a geographical site, and is time consuming in deployment. Disadvantageously, if geographical distribution of the bandwidth requirements changes over time so that the bandwidth requirements for the given BTS reduces, any newly installed BTSs will become redundant. In the case of the WLAN, redeployment of staff within a building/group of buildings is an example of the change of bandwidth requirements.

Given that an aim of wireless communications system design is to reduce the number of BTSs required by increasing the range of the BTSs and/or capacity, i.e. the number of terminals able to communicate effectively with a given antenna arrangement, there is a tendency for cellular communications network operators to consider alternative ways of increasing capacity in the cellular communications network. In the case of data communications, traffic generated by the terminals is in the form of bursts of traffic, known as bursty traffic. Consequently, there is a requirement for an instantaneous high bandwidth of, typically, short duration. However, of the total number of terminals capable of communication with the given BTS, only a fraction of the total number of terminals are simultaneously active at a given time.

In the example of the WLAN, all of the terminals may be switched on and logged onto the WLAN, but only 10% of the terminals may actually be actively using the WLAN and communicating content, for example voice or data traffic. Of the 10% of the total number of the terminals, only a small proportion thereof may be actively downloading data at any instant in time. In this respect, the European Telecommunications Standards Institute (ETSI) $3^{rd}$ Generation (3G) data model recommendations for simulation purposes are that Web browsers download new web pages at about 4 minute intervals, and the average download volume is of the order of 20 kbytes. Thus, only a small number of terminals can be expected to be downloading at any particular instant in time.

Code Division Multiple Access (CDMA) schemes are known to employ "soft handoff" as a way of improving capacity of cellular communications systems. A mobile terminal at an edge of a cell is typically capable of communicating with two, or three BTSs capable of transmitting signals at similar signal strength levels from centres of nearby cells. If the mobile terminal is only communicating with one BTS, a Carrier-to-Interference (C/I) ratio is usually low due to the mobile terminal being at the edge of the cell. Consequently, a Quality of Service (QoS) provided by the mobile terminal is often poor and it is not uncommon for error rates to be high and calls to be dropped.

If, however, more than one BTS is communicating with the mobile terminal and all the BTSs communicating with the mobile terminal are controlled to transmit exactly the same data waveforms to the mobile terminal, then receivers in the mobile terminal process the same data from a single BTS. Consequently, the C/I ratio is increased by a factor of two or three.

SUMMARY OF THE INVENTION

According to a first aspect of the present invention, there is provided a wireless communications system comprising a terminal capable of communicating with a plurality of base stations using a respective plurality of simultaneous communications links, a number of the plurality of simultaneous communications links bearing content data, wherein the content data borne by each of the number of the plurality of simultaneous communications links are non-identical.

Preferably, at least one of the plurality of base stations supports a plurality of sectors. More preferably, the at least one of the plurality of base stations comprises a sectored antenna.

Preferably, the terminal comprises an antenna arrangement arranged to direct a sector or beam to one of the plurality of base stations for providing a near-isolated communications link to the one of the plurality of base stations. Consequently, a plurality of modems of the terminal are able to differentiate between the number of the plurality of communications links. The terminal may comprise a multibeam antenna to provide the isolation between communications links. It is thus possible to selectively direct beams of the antenna at the number of the plurality of base stations and support a number of respective near-isolated communications links between the terminal and the number of the plurality of base stations. Additionally, it is also possible to differentiate between the number of the plurality of communications links, thereby allowing interference avoidance. CDMA schemes may be employed where imperfectly isolated communications links are present.

Preferably, at least two of the communications links are completely isolated from each other.

Preferably, the system further comprises a routing entity capable of dividing the content data between the number of the plurality of communications links so that a proportion of the content data is communicated over a communications link of the number of the plurality of communications links and another proportion of the data is simultaneously communicated over another communications link of the number of the plurality of communications links.

Preferably, a source of the content data comprises the routing entity.

Preferably, the routing entity is arranged to control routing of virtual circuits so as to cause the proportion of the data to be communicated over the communications link of the number of the plurality of the communications links.

Preferably, the system further comprises a controller unit, the controller unit comprising the routing entity.

Preferably, the routing entity is arranged to edit headers of data units to contain an address corresponding to the communications link of the number of the plurality of the communications links.

Preferably, the routing entity is arranged to edit path identifiers of data units so that the proportion of the data is communicated over the communications link of the number of the plurality of communications links.

Preferably, the system further comprises a controller unit, the controller unit being arranged to select the number of the plurality of communications links from the plurality of communications links in response to respective signal quality criteria of the plurality of communications links. More preferably, the controller is arranged to select the number of the plurality of communications links from the plurality of communications links in response to respective bandwidth availability of the plurality of communications links.

According to a second aspect of the present invention, there is provided a communications terminal comprising a plurality of modems coupled to an antenna arrangement, the antenna arrangement supporting a plurality of simultaneous communications links, a number of the plurality of simultaneous communications links bearing content data, wherein the content data born by each of the number of the plurality of simultaneous communications links are non-identical.

Preferably, the terminal comprises a sectored multiple beam antenna arranged to direct an antenna beam to one of the plurality of base stations for providing a near-isolated communications link to the one of the plurality of base stations.

According to a third aspect of the present invention, there is provided a controller for distributing content data between a plurality of base stations and a terminal using a number of simultaneous communications links bearing the content data, the content data born by each of the number of the plurality of simultaneous communications links being non-identical.

Preferably, the controller can be provided in a network entity, for example, a Base Station Controller, a Mobile services Switching Centre, or in the case of third generation communications systems a Radio Network Controller.

According to a fourth aspect of the present invention, there is provided a method of communicating data between a plurality of base stations and a terminal, the method comprising the step of: establishing a plurality of respective simultaneous communications links between the plurality of base stations and the terminal, a number of the plurality of simultaneous communications links bearing content data, wherein the content data born by each of the number of the plurality of simultaneous communications links are non-identical.

Preferably, the terminal comprises an antenna arrangement, and the method further comprises the step of: directing a sector or a beam to one of the plurality of base stations for providing a near-isolated communications link to the one of the plurality of base stations.

Preferably, the method further comprises the step of: communicating the data via the number of the plurality of communications links, a proportion of the data being communicated over a communications link of the number of the plurality of communications links and another proportion of the data being simultaneously communicated over another communications link of the number of the plurality of communications links.

Preferably, a source of the content data controls routing of virtual circuits so as to cause the proportion of the content data to be communicated over the communications link of the number of the plurality of the communications links.

Preferably, the method further comprises the step of: editing headers of data units to contain an address corresponding to the communications link of the number of the plurality of the communications links.

Preferably, the method further comprises the step of: editing path identifiers of data units so that the proportion of the data is communicated over the communications link of the number of the plurality of communications links.

Preferably, the method further comprises the step of: selecting the number of the plurality of communications links from the plurality of communications links in response to respective signal quality criteria of the plurality of communications links. More preferably, the method further comprises the step of: selecting the number of the plurality of communications links from the plurality of communications links in response to respective bandwidth availability of the plurality of communications links.

According to a fifth aspect of the present invention, there is provided computer executable software code stored on a computer readable medium, the code being for communicating data between a plurality of base stations and a terminal, the code comprising: code to establish a plurality of simultaneous communications links between the plurality of base stations and the terminal, a number of the plurality of simultaneous communications links bearing content data, wherein the content data born by each of the number of the plurality of simultaneous communications links is non-identical.

Preferably, the terminal comprises a sectored multiple beam antenna, and the code further comprises: code to direct a sector or a beam to one of the plurality of base stations for providing a near-isolated communications link to the one of the plurality of base stations.

Preferably, the code further comprises; code to communicate the content data via the number of the plurality of communications links, a proportion of the data being communicated over a communications link of the number of the plurality of communications links and another proportion of the data being simultaneously communicated over another communications link of the number of the plurality of communications links.

Preferably, the code further comprises code to enable a source of the content data controls routing of virtual circuits so as to cause the proportion of the content data to be communicated over the communications link of the number of the plurality of the communications links.

Preferably, the code further comprises: code to edit headers of data units to contain an address corresponding to the communications link of the number of the plurality of the communications links.

Preferably, the code further comprises: code to edit path identifiers of data units so that the proportion of the data is communicated over the communications link of the number of the plurality of communications links.

Preferably, the code further comprises: code to select the number of the plurality of communications links from the plurality of communications links in response to respective signal quality criteria of the plurality of communications links. More preferably, the code further comprises: code to select the number of the plurality of communications links from the plurality of communications links in response to respective bandwidth availability of the plurality of communications links.

According to a sixth aspect of the present invention, there is provided a programmed computer for communicating data between at least one base station and a terminal, comprising memory having at least one region for storing computer executable program code, and a processor for executing the program code stored in memory, wherein the program code includes: code to establish a plurality of simultaneous communications links between the plurality of base stations and the terminal, a number of the plurality of simultaneous communications links bearing content data, wherein the content data born by each of the number of the plurality of simultaneous communications links is non-identical.

Preferably, the terminal comprises a sectored multiple beam antenna, and the program code further comprises: code to direct a sector or a beam to one of the plurality of base stations for providing a near-isolated communications link to the one of the plurality of base stations.

Preferably, the program code further comprises: code to communicate the content data via the number of the plurality of communications links, a proportion of the data being communicated over a communications link of the number of the plurality of communications links and another proportion of the data being simultaneously communicated over another communications link of the number of the plurality of communications links.

Preferably, the program code further comprises code to enable a source of the content data controls routing of virtual circuits so as to cause the proportion of the content data to be communicated over the communications link of the number of the plurality of the communications links.

Preferably, the program code further comprises: code to edit headers of data units to contain an address corresponding to the communications link of the number of the plurality of the communications links.

Preferably, the program code further comprises: code to edit path identifiers of data units so that the proportion of the data is communicated over the communications link of the number of the plurality of communications links.

Preferably, the program code further comprises: code to select the number of the plurality of communications links from the plurality of communications links in response to respective signal quality criteria of the plurality of communications links. More preferably, the program code further comprises: code to select the number of the plurality of communications links from the plurality of communications links in response to respective bandwidth availability of the plurality of communications links.

According to a seventh aspect of the present invention, there is provided a computer readable medium having computer executable software code stored thereon, the code being for communicating data between at least one base station and a terminal and comprising: code to establish a plurality of simultaneous communications links between the plurality of base stations and the terminal, a number of the plurality of simultaneous communications links bearing content data, wherein the content data born by each of the number of the plurality of simultaneous communications links is non-identical.

Preferably, the terminal comprises a sectored multiple beam antenna, and the program code further comprises: code to direct a sector or a beam to one of the plurality of base stations for providing a near-isolated communications link to the one of the plurality of base stations.

Preferably, the program code further comprises: code to communicate the content data via the number of the plurality of communications links, a proportion of the data being communicated over a communications link of the number of the plurality of communications links and another proportion of the data being simultaneously communicated over another communications link of the number of the plurality of communications links.

Preferably, the program code further comprises: code to enable a source of the content data controls routing of virtual circuits so as to cause the proportion of the content data to be communicated over the communications link of the number of the plurality of the communications links.

Preferably, the program code further comprises: code to edit headers of data units to contain an address corresponding to the communications link of the number of the plurality of the communications links.

Preferably, the program code further comprises; code to edit path identifiers of data units so that the proportion of the data is communicated over the communications link of the number of the plurality of communications links.

Preferably, the program code further comprises: code to select the number of the plurality of communications links from the plurality of communications links in response to respective signal quality criteria of the plurality of communications links. More preferably, the program code further comprising: code to select the number of the plurality of communications links from the plurality of communications links in response to respective bandwidth availability of the plurality of communications links.

In the above described aspects of the invention, the terminal may communicate with at least one of the plurality of base stations for a limited duration using as many communications links as necessary, or feasible. In fact, it should be appreciated that the terminal can have a same functionality as one of the plurality of base stations set forth in relation to the above aspects of the invention.

It should be further appreciated that the content data may comprise a plurality of contents, for example, video data, audio data, software files and/or stern data, optionally, in the form of respective data streams. Furthermore, the plurality of contents may originate from one or more sources, for example, content servers. Additionally, at least one of the plurality of contents may not be destined for the terminal, but instead may be destined for another terminal. In this respect, the terminal acts as a relay for onward communication of data.

Advantageously, it is thus possible to increase capacity available to the terminal, thereby enabling costs to be reduced, because the need to provide additional base stations is obviated. Also, a greater instantaneous data capacity is available to the terminal than would otherwise be provided.

It is thus possible to increase the peak data bandwidth of communications to and from the terminal beyond the peak data bandwidth of a single base station to allow efficient connectionless radio services for burst packet radio traffic, for example General Packet Radio Service (GPRS) traffic, Internet Protocols (IPs) traffic, and Variable Bit Rate (VBR) traffic such as Moving Picture Experts Group (MPEG) 2 traffic. In such services, the peak of the data bit rate may be more than ten times the average value of the data bit rate. Additionally, it is also possible to remove some radio bottlenecks between the base stations and the terminal due to limited link bandwidth. Accordingly, a data rate of the terminal is not limited by the bandwidth of a single communications link. It is also possible to enhance average bit-rate performance of terminals and wireless LAN's, hence providing shorter download times. Thus, the QoS of a connection is enhanced, providing a significant advantage over terminals that do not employ any of the above described aspects of the present invention. The provision of certain wide-band data services is therefore much more feasible and hence attractive to operators.

The invention is also particularly effective for data streams using datagrams such as packets, or VBR streams. The invention is also particularly useful for transfer of Internet traffic, where high peaks of data flow can be directed to different radio terminals by advanced cellular routing, packet scheduling algorithms and ad-hoc radio network concepts in such a way that any ordered sequence of the content data can be reconstituted. In this way, any bursty nature of data traffic is used to advantage in order to optimise limited radio resources. Hence, radio resource limitations of cellular radio systems are at least mitigated, if not obviated.

The routing entity may be arranged to provided data routing and ad-hoc radio network methods to establish routing tables for radio channels.

The above aspects of the invention may employ a standard multiple access or multiplexing scheme, such as CDMA, TDMA, FDMA, FDM or some combination of these schemes, for example, a CDMA TDMA combination being employed by $3^{rd}$ generation cellular communications systems.

BRIEF DESCRIPTION OF THE DRAWINGS

At least one embodiment of the present invention will now be described, by way of example only, with reference to the accompanying drawings, in which.

DETAILED DESCRIPTION OF THE INVENTION

Throughout the following description identical reference numerals will be used to identify like parts.

In a WLAN 100 (FIG. 1) a plurality of base station transceivers (BTSs), for example a first, second, third, fourth, fifth, sixth, seventh, eighth and ninth BTSs 102, 104, 106, 108, 110, 112, 114, 116, 118, are located, for example, on a floor of a building (not shown).

Figure 1:
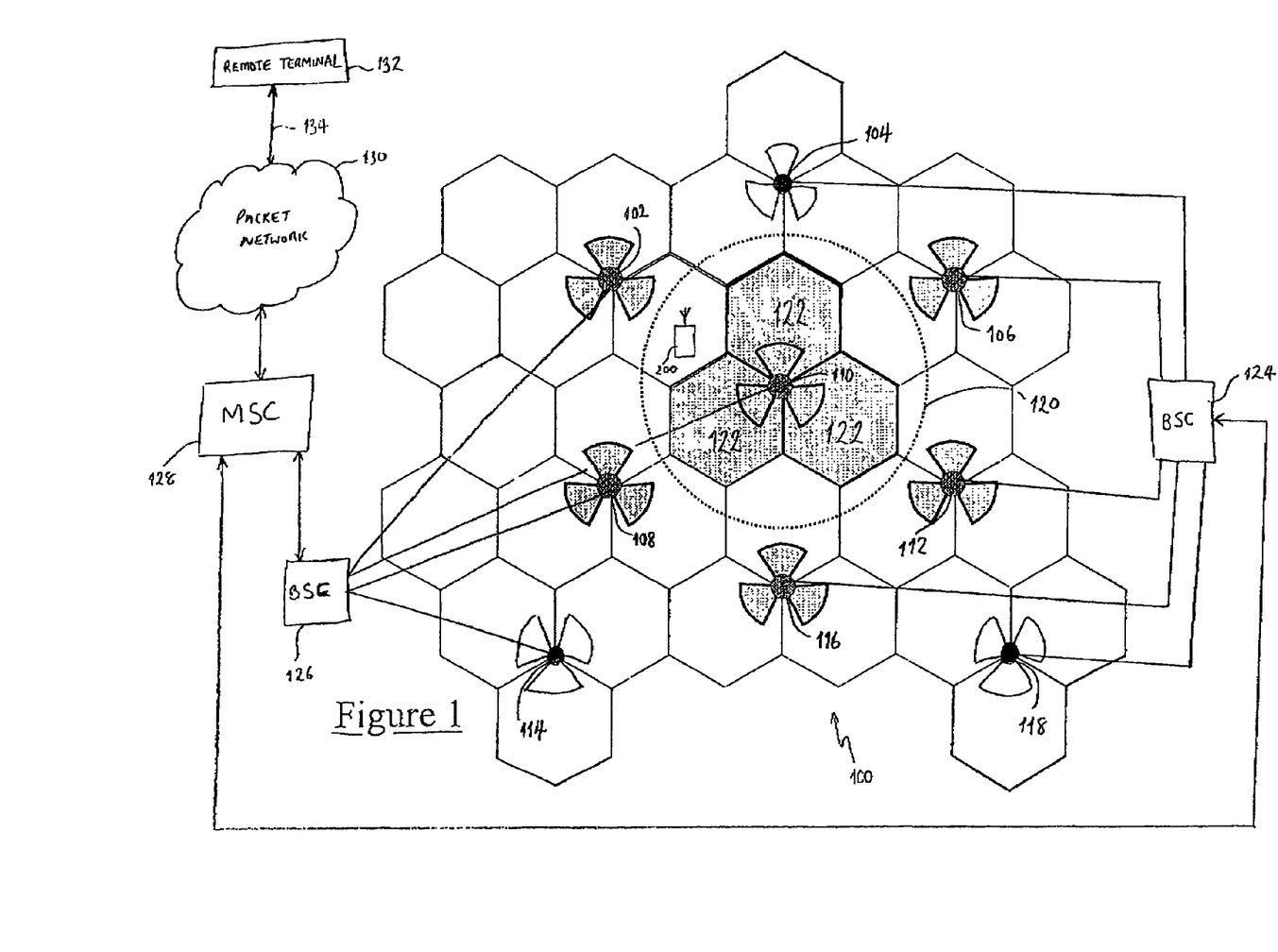
FIG. 1 is a schematic diagram of a WLAN for use with a first embodiment of the present invention.

The first, second, third, fourth, sixth and eighth BTSs 102, 104, 106, 108, 112, 116 surround the fifth BTS 110 to form a first BTS tier. A second ring of BTSs including the seventh BTS 114, the ninth BTS 118 and other BTSs (not shown) surround the first, second, third, fourth, sixth and eighth BTSs 102, 104, 106, 108, 112, 116 to form a second BTS tier. The second, third, sixth, eighth and ninth BTSs 104, 106, 112, 116, 118 are coupled to a first Base Station Control (BSC) using a hard-wired or wireless communication link and the first, fourth, fifth and seventh STSs 102, 108, 110, 114 are similarly coupled to a second BSC 126. The first and second BSCs are coupled to a Mobile services Switching Centre (MSC) 128. The first and second BSCs 124, 126 comprise a scheduler executing a scheduling algorithm that supports an intermediate sub-layer (not shown) that lies on top of a communications physical layer (not shown). The MSC 128 is capable of providing access to external networks, for example, a packet network 130 and/or a Public Switched Telephone Network (PSTN). The packet network 130 is coupled to a remote terminal, for example, a web content server 132 by means of a communications link 134, the web content server 132 being provided with a LAN interface card (not shown).

For the purposes of clarity and ease of understanding, the structure of the fifth BTS 110 will now be described. However, it should be appreciated that the structure is equally applicable to the other of the plurality of BTSs, for example, the first, second, third, fourth, sixth, seventh, eighth and ninth BTSs 102, 104, 106, 108, 112, 114, 116, 118, although variations upon the following structure are also conceivable.

The fifth BTS 110 supports a corresponding fifth cell 120 comprising three approximately equally sized sectors 122. The sectors 122 are notionally hexagonal in shape and are positioned next to one another in combination with other sectors supported by the plurality of BTSs so as to tessellate and form a honeycomb pattern. The three approximately equally sized sectors 122 are supported by three respective directional antennas, each of the three directional antennas forming beams, typically having a 60°, −3 dB beamwidth. Each of the three beams is respectively directed substantially over the three sectors 122 so as to provide radio frequency (RF) coverage in the three sectors 122. Although hexagonal shaped sectors are being used in this example, it should be appreciated that other shaped sectors can be used in the WLAN 100. Additionally, it should be understood that the layout of the plurality of BTSs in the WLAN 100 can be optimised in accordance with any known network deployment optimisation algorithm known in the art.

Figure 2:
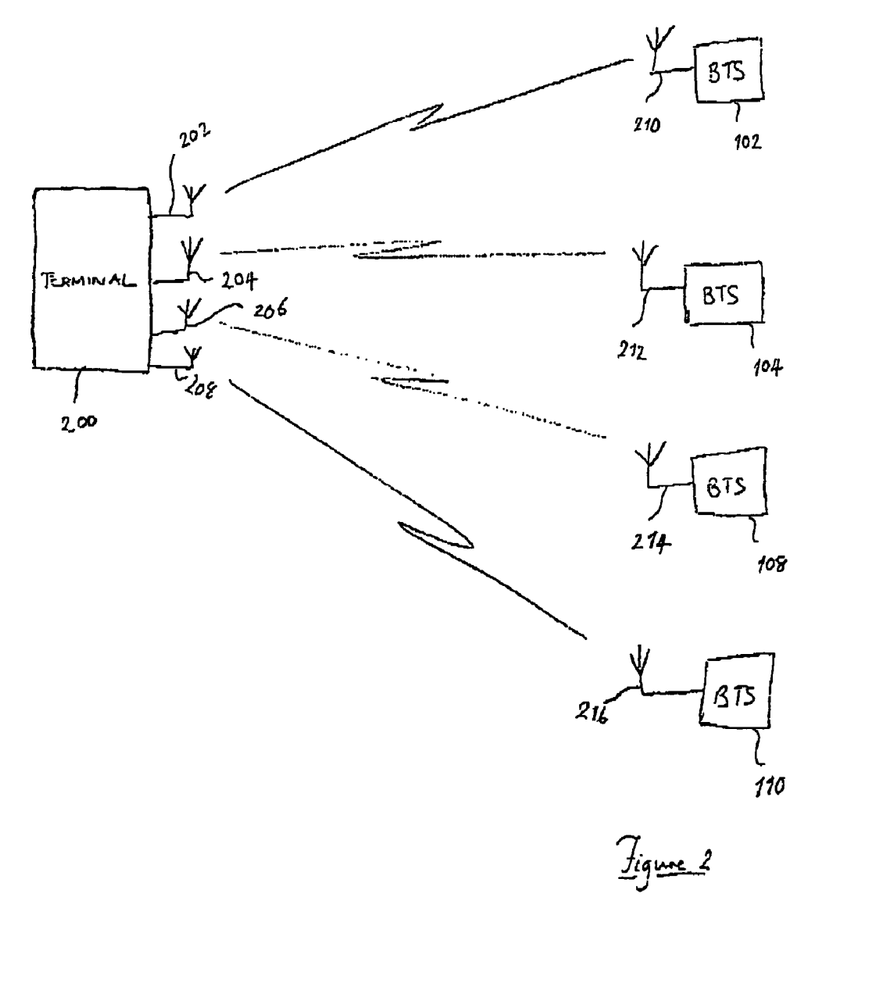
FIG. 2 is a schematic diagram of a terminal for communicating with BTSs constituting the first embodiment.

A terminal 200 located in the fifth cell 120 comprises (FIG. 2) a first antenna element 202, a second antenna element 204, a third antenna element 206 and a fourth antenna element 208. The first antenna element 202, the second antenna element 204, the third antenna element 206 and the fourth antenna element 208 are capable of communicating RF signals with a first BTS antenna 210, a second BTS antenna 212, a third BTS antenna 214 and a fourth BTS antenna 216, respectively. The first BTS antenna 210 is coupled to the first BTS 102, the second, third and fourth BTS antennae 212, 214, 216 being coupled to the second BTS 104, the fourth BTS 108 and the fifth BTS 110, respectively. The communication of signals between the terminal 200 and the plurality of base stations constitutes a plurality of communications links. By communications links, it should be appreciated that this term is intended to include all methods of wireless communication in any wireless medium. Additionally, the term "terminal" should be understood to include a relay station.

Figure 3:
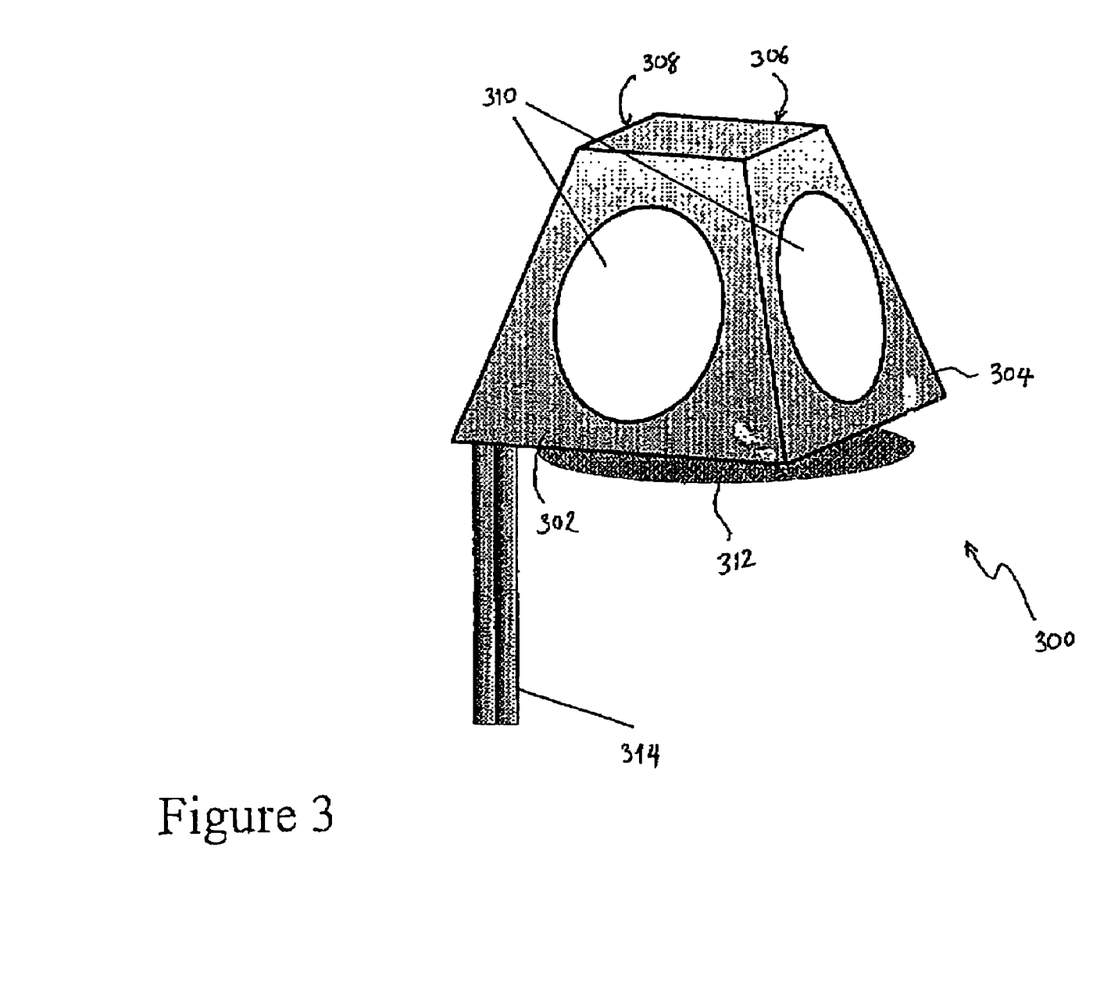
FIG. 3 is a schematic diagram of a terminal antenna unit of FIG. 2.

Referring to FIG. 3, the first, second, third and fourth antenna elements 202, 204, 206, 208 are provided by a terminal antenna unit 300. The terminal antenna unit 300 is shaped so as to resemble a truncated square-based pyramid, although other shapes are also possible. Consequently, the terminal antenna unit 300 comprises four sloped surfaces 302, 304, 306, 308, each comprising a printed antenna patch 310. For operation at around 5 GHz, the printed antenna patches 310 are dimensioned to have an area of about 6 cm$^2$. The terminal antenna unit 300 is therefore a four-sectored antenna capable of simultaneously receiving signals from up to 4 BTSs. In this example, the terminal antenna unit 300 performs a dual function by acting as a desk tidy or the like. The terminal antenna unit 300 comprises a base 312 that can be weighted, magnetic or have a suction cup attached thereto. Consequently, the terminal antenna unit 300 can be maintained in a desired position by means of gravity, a magnetic field or suction. The terminal antenna unit 300 is coupled to the terminal 200 by a cable 314. The cable 314 can comprise a number of connections (hard-wired or wireless) to other terminals so that the terminal antenna unit 300 can be shared in an office environment by more than one terminal, provided the terminal antenna unit 300 includes a preamplifier unit (not shown).

It should be appreciated that the terminal antenna unit 300 can also be deployed in a vehicle. Additionally, when the terminal antenna unit 300 has to operate at frequencies below 5 GHz, the dimensions of the terminal antenna unit 300 consequently increase.

Although not used in this example, the terminal antenna unit 300 can include dipoles arranged with reflectors in order to define sector coverage.

In another example (FIG. 4), the first, second, third, fourth, fifth, sixth, seventh, eighth and ninth BTSs 102, 104, 106, 108, 110, 112, 114, 116, 118 can be notionally arranged in a rectangular configuration (for the purpose of analysing respective radio links between terminals and BTSs). A first, second, third, fourth, fifth, sixth and seventh terminal 400, 402, 406, 408, 410, 412 are provided, instead of the terminal 200, amongst the first, second, third, fourth, fifth, sixth, seventh, eighth and ninth BTSs 102, 104, 106, 108, 110, 112, 114, 116, 118. In this example, the first, second, third, fourth, fifth, sixth, seventh, eighth and ninth BTSs 102, 104, 106, 108, 110, 112, 114, 116, 118 are each 8-sectored resulting in a plurality of potentially available sectors and each of the first, second, third, fourth, fifth, sixth and seventh terminals 400, 402, 404, 406, 408, 410, 412 are quad-sectored. Consequently, each of the first, second, third, fourth, fifth, sixth and seventh terminals 400, 402, 404, 406, 408, 410, 412 have a high probability of each communicating with a respective at least one of the plurality of BTSs using a dedicated BTS sector so as to achieve full use of link bandwidth available between each of the first, second, third, fourth, fifth, sixth, seventh, eighth and ninth BTSs 102, 104, 106, 108, 110, 112, 114, 116, 118 and each of the first, second, third, fourth, fifth, sixth and seventh terminals 400, 402, 404, 406, 408, 410, 412.

Figure 4:
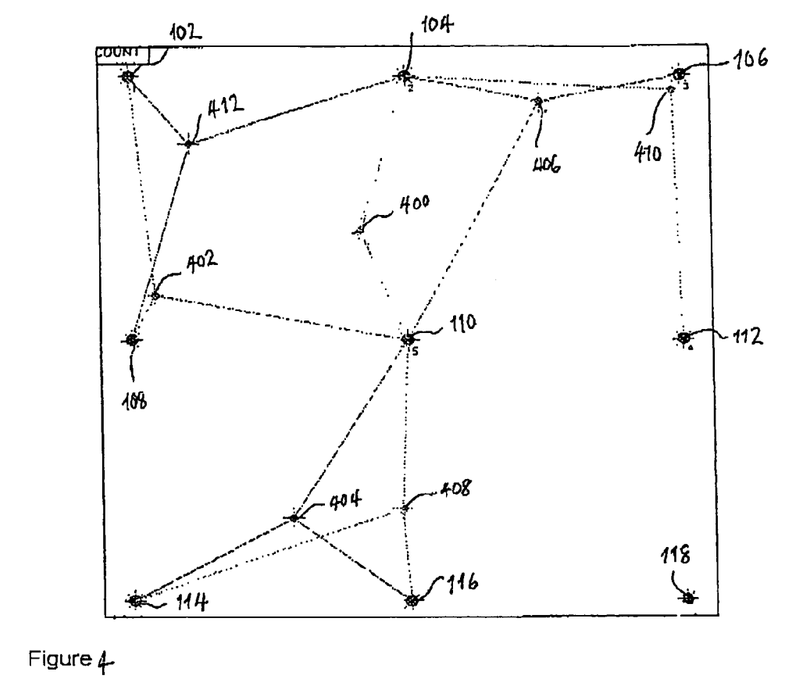
FIG. 4 is a schematic diagram of the WLAN of FIG. 1 in the form of a rectangular layout with seven randomly located terminals.

Additionally, the first, second, third, fourth, fifth, sixth and seventh terminals 400, 402, 404, 406, 408, 410, 412 are capable of communicating with three sectors selected from amongst the plurality of potentially available sectors. Consequently, when aggregated, the individual link bandwidths of the sectors used to communicate with a given terminal from amongst the first, second, third, fourth, fifth, sixth or seventh terminals 400, 402, 404, 406, 408, 410, 412 effectively results in a total bandwidth corresponding to a multiple of the link bandwidth that would otherwise be available to the given terminal if a single link were used, the multiple of the link bandwidth depending upon the number of communications links between the given terminal and a number of the plurality of BTSs. However, in some cases, a number of the first, second, third, fourth, fifth or sixth or seventh terminals 400, 402, 404, 406, 408, 410, 412 need to share sectors of a number of the first, second, third, fourth, fifth, sixth, seventh, eighth or ninth BTSs 102, 104, 106, 108, 110, 112, 114, 116, 118 or vice versa, Consequently, fractional bandwidth increments corresponding to any shared sectors contribute to the multiple of the bandwidth.

In operation (FIG. 5), a user operating the terminal 200 (or any of the first, second, third, fourth, fifth, sixth or seventh terminals 400, 402, 404, 406, 408, 410, 412, i.e. both of the above examples) requests (step 500) access to the MSC 128 in order to obtain data from the web content server 132. In order to remain compatible with terminals that do not possess the terminal antenna unit 300, access is granted (step 502) to a BTS closest to the terminal 200. As a result of a service required by the user, for example, a download of information from the web content server 132 using a web browser (not shown), the terminal 200 requests (step 504) higher bandwidth to speed download of the web content. In response, the second BSC 126 requests that the terminal 200 provides measurements of Signal-to-Noise Ratios (SNRs) from available BTSs amongst the first, second, third, fourth, fifth, sixth, seventh, eighth and ninth BTSs 102, 104, 106, 108, 110, 112, 114, 116, 118. Consequently, the terminal 200 identifies (step 506) the available BTSs with acceptable SNRs and reports (step 508) the SNRs to the second BSC 126. The second BSC 126 then determines suitable bit rates for communications between the available BTSs and the terminal 200 and also determines, of the available BTSs, those suitable to support communications links with the terminal 200 in the light of demands of other terminals.

Figure 5:
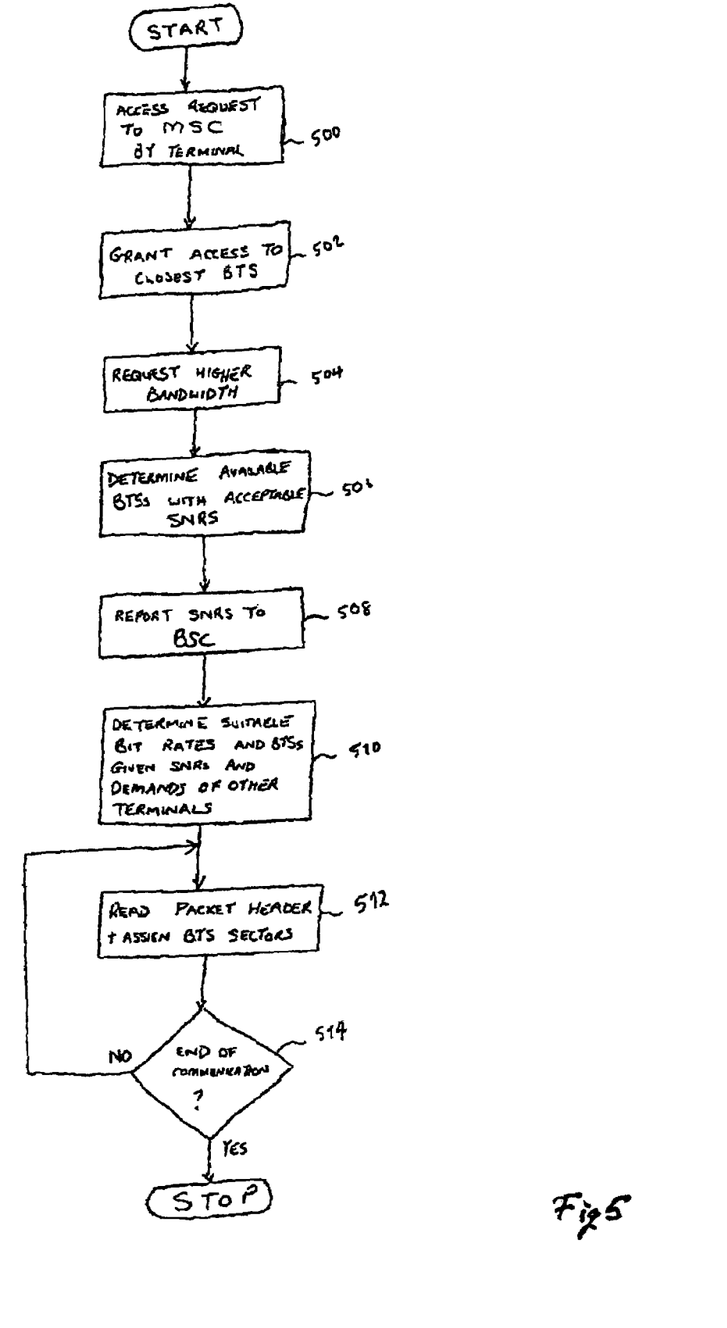
FIG. 5 is a flow diagram of a method for use with the system and apparatus of FIGS. 1, 2 and 3.

Once the suitable BTSs have been assigned with corresponding suitable bit rates for communication with the terminal 200, the scheduler distributes data units between a number of the plurality of communications links respectively provided by the suitable BTSs. In this respect, the scheduler monitors incoming content data received from the web content server and generates (step 512) headers for outgoing physical layer data units for reconstitution in the correct order by the terminal 200 upon receipt thereof. The scheduler distributes each physical layer data unit, either individually or in groups, to a one of a number of BTS sectors amongst the suitable BTSs in accordance with any suitable allocation scheme know in the art, for example, a strict rotation scheme, or a proportionally fair scheduling algorithm. In order to ensure reconstitution of the data units in a correct order, the scheduler appends information corresponding to a correct order of receipt of the data units. In the event that interaction is required by both the first and second BSCs 124, 126, the schedulers in the first and second BSCs 124, 126 can be coordinated by the MSC 128. Of course, it should be understood that the scheduler(s) can distribute content data from a number of sources.

Whilst directing the data units to the suitable BTSs, the scheduler monitors data units to identify the end of the download session (step 514).

Alternatively, distribution of the data amongst the suitable BTSs can be done in the IP layer (by the web content server 132) by assigning each packet an explicit route in accordance with, for example, any known label swapping technique, such as WP switching techniques, a Cell Switching Router (CSR) technique, a tag switching technique, or a Multi Protocol Label Switching (MPLS) technique. The web content server 132 can alternatively be arranged to distributes packets for transmission by the suitable BTSs by suitably adapting an IP Source Route Option that currently lists up to seven hops that each packet should traverse en route to a destination.

In relation to the proportionally fair algorithm (FIG. 6) mentioned above, the communications network 100 is described by session flows and resources. A session is a source to sink data flow and a resource is a component, such as a model or radio transmitter with a bandwidth constraint. The session flows are adjusted by imposing costs associated with each resource through which a session flows. Thus, session #1 with bandwidth $X_1$ has accumulated resource costs of $$Y_1 = S_1(\lambda_1 + p_{12} + \mu_2)$$

Figure 6:
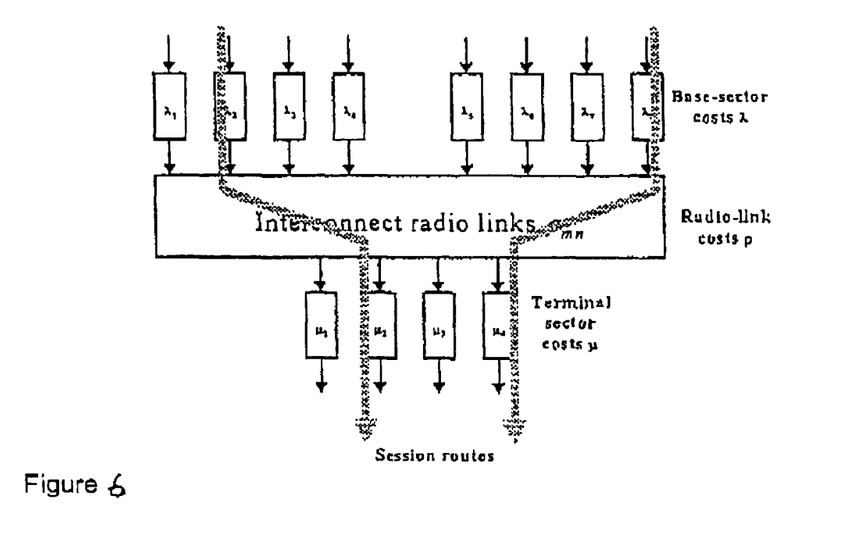
FIG. 6 is a schematic diagram of resources associated with the communications links.

Where:
S is a Lagrange multiplier;
$\lambda_1$ is a base sector cost;
$p_{12}$ is a radio link cost;
$\mu_2$ is a terminal sector cost.

Conversely, if session #1 submits a session value bid of $V_1$, then the bandwidth allocated by the network is $$x_1 = \frac{V_1}{\lambda_1 + p_{12} + \mu_2}$$

Resource costs are varied to limit the data flows to the resource capacity and this is done in a unilateral fashion by the resources. If resource #K has a capacity of $C_k$, but a flow of $W_k$ then a cost $p_k$ should be increased (or decreased) according to the ratio:

$$\rho_k = \rho_k \frac{W_k}{C_k}$$

Resource costs can vanish to zero if there is not enough bandwidth to fill an associated capacity.

Figure 7:
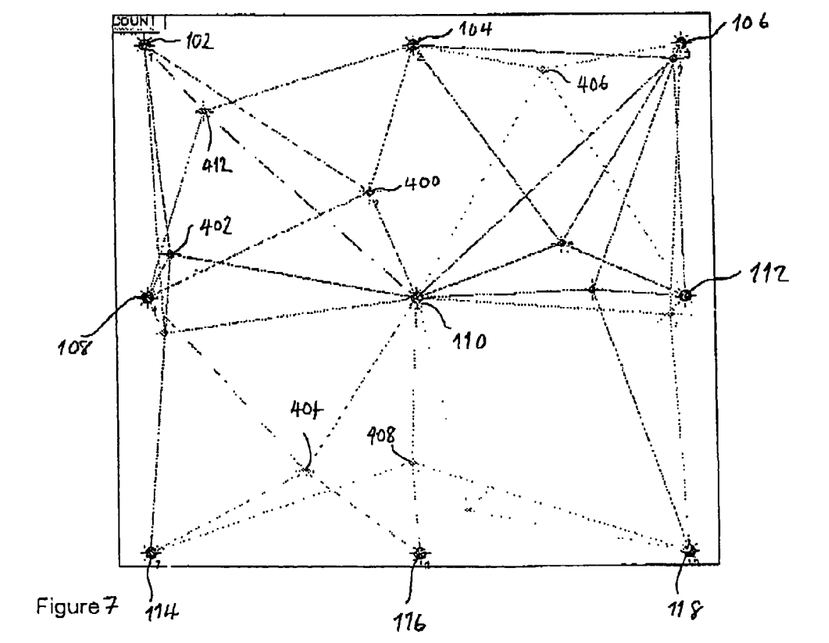
FIG. 7 is a congested version of the WLAN of FIG. 4 exhibiting a high connectivity.
Figure 8:
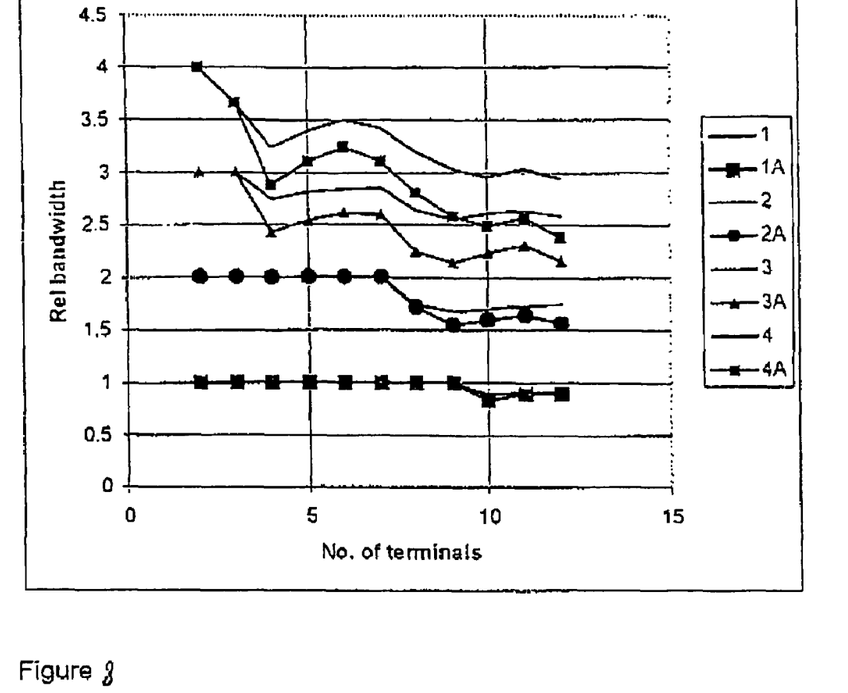
FIG. 8 is a graph depicting average delivered bandwidth compared with terminal numbers and number of terminal sectors.

In a further example (FIG. 7) comprising twelve terminals instead of the 7 terminals in the environment of FIG. 4, FIG. 8 shows the bandwidth offered to a number of terminals with increasing amounts of congestion when using the proportionally fair algorithm described above. The terminals, numbering between 2 and 12 each establish connections with M=1, 2, 3 and 4 surrounding BTSs. With only two terminals there is little contention and the offered bandwidth is the maximum that the modems links will support, i.e. 1, 2, 3 and 4 units.

As the number of terminals increases, the probability of a conflict or contention between two terminals increases, i.e. two terminals attach to the same base station sector and some bandwidth therefore needs to be shared. For example, with 10 terminals the offered bandwidth falls to about ⅔ of the ideal.

Two types of noise are present in the results shown in FIG. 8. The lines without markers correspond to a thermal noise only limit. The marked lines correspond to an interference limitation condition for a CDMA modulation system with an average cross-correlation between codes of 40% caused by multipath dispersion in the channel.

It should be appreciated that the above described examples are equally applicable in the uplink direction, i.e. the transfer of data from the terminal 200 to the plurality of BTSs.

The terminal 200 receives, via the terminal antenna unit 300, the data units (or packets) transmitted by the web content server 132, not necessarily in a correct order, and assembles the data units (or packets) into the correct order using the data unit number (or packet number) information provided with each data unit (or packet) by the scheduler.

The above described examples Illustrate a substantial bandwidth increase relative to a standard radio link to a single base station. For limited numbers of active terminals the increase is effectively in proportion to the number of communications links established. With increasing numbers of active terminals congestion reduces bit rate gains by one third or more. Given a fairly regular layout of BTSs, it is likely that each terminal can actually access four BTSs, resulting in a bandwidth expansion of almost four. Such a level of radio linking is consistent with terminals that are provided with antennas having four sectors.

The usage of the base stations is asymmetric and the sectors of the peripheral base stations are used less. It is best to operate any given base station with a rather larger number of sectors in order to reduce the probability of more than one terminal sharing a sector of the given base station.

If a larger number of redundant closely spaced BTSs are installed, then communications links to many more base stations can be set up from each terminal; however, many base stations would share the same terminal antenna sector. Given the bandwidth limitation of the terminal modems, the sectorisation of the terminal antenna unit 300 has to increase in order to allow further independent communications links to be set up with the BTSs.

Bandwidth increase is strictly bounded by the number of terminal antenna sectors of each terminal antenna unit 300, because each of the terminal antenna sectors only has one modem. Nevertheless, under sparse terminal conditions, it can be expected that the bandwidth available to given terminal will normally be increased in the ratio of the number of sectors.

The probability of any given terminal having to share bandwidth of a given BTS modem is related to the probability that more than one terminal can be covered by each sector of the given BTS. In sparse user conditions, it is possible to operate with few or no BTS sectors and still get a good bandwidth increase, but in congested conditions the sectorisation of the base station antenna must increase in proportion to the number of terminals present. The provision of eight sectors per BTS enables operation in a fairly congested environment.

In order to enable costs of deployment to be controlled, it is not essential to populate antenna sectors fully with modems, because modems can be switched between antenna sectors, i.e. a highly sectored antenna can use a smaller number of modems multiplexed by analog RF switches.

In multipath conditions the directional patterns of the antenna sectors will be distorted and this will cause some capacity loss due to mutual interference between nominally isolated patterns. However, in bad conditions, multi-user adaptive antenna signal processing methods can be used to restore system capacity.

It is believed that the system is particularly compatible with indoor wireless networks such as HYPERLAN or HYPERLAN II. However, the above described examples are also applicable to pico-cells in a third generation communications system, for example, a Wideband-CDMA cellular system as employed by the Universal Mobile Telecommunications System (UMTS), Terrestrial Radio Access Network (UTRAN).

Although the above examples have been described in the context of the WLAN 100, it should be appreciated that the above examples are analogously applicable to other cellular communications networks having a wider coverage area, for example, a traditional cellular communications network, by a respective BTS. In such an embodiment, the BTS can comprise three directional antennas to support three respective sectors.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

The invention claimed is:

1. A wireless communications system comprising a terminal capable of communicating with a plurality of base stations using a respective plurality of simultaneous communications links, a number of the plurality of simultaneous communications links bearing content data, wherein the content data borne by each of the number of the plurality of simultaneous communications links are non-identical.

2. A system as claimed in claim 1, wherein at least one of the plurality of base stations supports a plurality of sectors.

3. A system as claimed in claim 2, wherein the at least one of the plurality of base stations comprises a sectored antenna.

4. A system as claimed in claim 1, wherein the terminal comprises an antenna arrangement arranged to direct a sector or beam to one of the plurality of base stations for providing a near-isolated communications link to the one of the plurality of base stations.

5. A system as claimed in claim 1, wherein at least two of the communications links are completely isolated from each other.

6. A system as claimed in claim 1, further comprising a routing entity capable of dividing the content data between the number of the plurality of communications links so that a proportion of the content data is communicated over a communications link of the number of the plurality of communications links and another proportion of the data is simultaneously communicated over another communications link of the number of the plurality of communications links.

7. A system as claimed in claim 6, wherein a source of the content data comprises the routing entity.

8. A system as claimed in claim 7, wherein the routing entity is arranged to control routing of virtual circuits so as to cause the proportion of the data to be communicated over the communications link of the number of the plurality of the communications links.

9. A system as claimed in claim 6, further comprising a controller unit, the controller unit comprising the routing entity.

10. A system as claimed in claim 7, wherein the routing entity is arranged to edit headers of data units to contain an address corresponding to the communications link of the number of the plurality of the communications links.

11. A system as claimed in claim 9, wherein the routing entity is arranged to edit headers of data units to contain an address corresponding to the communications link of the number of the plurality of the communications links.

12. A system as claimed in claim 6, wherein the routing entity is arranged to edit path identifiers of data units so that the proportion of the data is communicated over the communications link of the number of the plurality of communications links.

13. A system as claimed in claim 1, further comprising a controller unit, the controller unit being arranged to select the number of the plurality of communications links from the plurality of communications links in response to respective signal quality criteria of the plurality of communications links.

14. A system as claimed in claim 13, wherein the controller is arranged to select the number of the plurality of communications links from the plurality of communications links in response to respective bandwidth availability of the plurality of communications links.

15. A method of communicating data between a plurality of base stations and a terminal, the method comprising the step of:
establishing a plurality of respective simultaneous communications links between the plurality of base stations and the terminal, a number of the plurality of simultaneous communications links bearing content data, wherein the content data born by each of the number of the plurality of simultaneous communications links are non-identical.

16. A method as claimed in claim 15, wherein the terminal comprises an antenna arrangement, and the method further comprises the step of:
directing a sector or a beam to one of the plurality of base stations for providing a near-isolated communications link to the one of the plurality of base stations.

17. A method as claimed in claim 15, further comprising the step of:
communicating the content data via the number of the plurality of communications links, a proportion of the data being communicated over a communications link of the number of the plurality of communications links and another proportion of the data being simultaneously communicated over another communications link of the number of the plurality of communications links.

18. A method as claimed in claim 17, wherein a source of the content data controls routing of virtual circuits so as to cause the proportion of the content data to be communicated over the communications link of the number of the plurality of the communications links.

19. A method as claimed in claim 17, further comprising the step of:
editing headers of data units to contain an address corresponding to the communications link of the number of the plurality of the communications links.

20. A method as claimed in claim 17, further comprising the step of:

editing path identifiers of data units so that the proportion of the data is communicated over the communications link of the number of the plurality of communications links.

21. A method as claimed in claim 15, further comprising the step of:
selecting the number of the plurality of communications links from the plurality of communications links in response to respective signal quality criteria of the plurality of communications links.

22. A method as claimed in claim 21, further comprising the step of:
selecting the number of the plurality of communications links from the plurality of communications links in response to respective bandwidth availability of the plurality of communications links.

23. Computer executable software code stored on a computer readable medium, the code being for communicating data between a plurality of base stations and a terminal, the code comprising:
code to establish a plurality of simultaneous communications links between the plurality of base stations and the terminal, a number of the plurality of simultaneous communications links bearing content data, wherein the content data born by each of the number of the plurality of simultaneous communications links is non-identical.

24. Computer executable software code as claimed in claim 23, wherein the terminal comprises a sectored multiple beam antenna, and the code further comprises:
code to direct a sector or a beam to one of the plurality of base stations for providing a near-isolated communications link to the one of the plurality of base stations.

25. Computer executable software code as claimed in claim 23, further comprising:
code to communicate the content data via the number of the plurality of communications links, a proportion of the data being communicated over a communications link of the number of the plurality of communications links and another proportion of the data being simultaneously communicated over another communications link of the number of the plurality of communications links.

26. Computer executable software code as claimed in claim 25, further comprising code to enable a source of the content data controls routing of virtual circuits so as to cause the proportion of the content data to be communicated over the communications link of the number of the plurality of the communications links.

27. Computer executable software code as claimed in claim 25, further comprising:
code to edit headers of data units to contain an address corresponding to the communications link of the number of the plurality of the communications links.

28. Computer executable software code as claimed in claim 25, further comprising:
code to edit path identifiers of data units so that the proportion of the data is communicated over the communications link of the number of the plurality of communications links.

29. Computer executable software code as claimed in claim 23, further comprising:
code to select the number of the plurality of communications links from the plurality of communications links in response to respective signal quality criteria of the plurality of communications links.

30. Computer executable software code as claimed in claim 29, further comprising:
code to select the number of the plurality of communications links from the plurality of communications links in response to respective bandwidth availability of the plurality of communications links.

31. A programmed computer for communicating data between at least one base station and a terminal, comprising memory having at least one region for storing computer executable program code, and
a processor for executing the program code stored in memory, wherein the program code includes:
code to establish a plurality of simultaneous communications links between the plurality of base stations and the terminal, a number of the plurality of simultaneous communications links bearing content data, wherein the content data born by each of the number of the plurality of simultaneous communications links is non-identical.

32. A programmed computer as claimed in claim 31, wherein the terminal comprises a sectored multiple beam antenna, and the program code further comprises:
code to direct a sector or a beam to one of the plurality of base stations for providing a near-isolated communications link to the one of the plurality of base stations.

33. A programmed computer as claimed in claim 31, the program code further comprising:
code to communicate the content data via the number of the plurality of communications links, a proportion of the data being communicated over a communications link of the number of the plurality of communications links and another proportion of the data being simultaneously communicated over another communications link of the number of the plurality of communications links.

34. A programmed computer as claimed in claim 33, the program code further comprising code to enable a source of the content data controls routing of virtual circuits so as to cause the proportion of the content data to be communicated over the communications link of the number of the plurality of the communications links.

35. A programmed computer as claimed in claim 33, the program code further comprising:
code to edit headers of data units to contain an address corresponding to the communications link of the number of the plurality of the communications links.

36. A programmed computer as claimed in claim 33, the program code further comprising:
code to edit path identifiers of data units so that the proportion of the data is communicated over the communications link of the number of the plurality of communications links.

37. A programmed computer as claimed in claim 31, the program code further comprising:
code to select the number of the plurality of communications links from the plurality of communications links in response to respective signal quality criteria of the plurality of communications links.

38. A programmed computer as claimed in claim 37, the program code further comprising:
code to select the number of the plurality of communications links from the plurality of communications links in response to respective bandwidth availability of the plurality of communications links.

39. A computer readable medium having computer executable software code stored thereon, the code being for communicating data between at least one base station and a terminal and comprising:
code to establish a plurality of simultaneous communications links between the plurality of base stations and the terminal, a number of the plurality of simultaneous communications links bearing content data, wherein the content data born by each of the number of the plurality of simultaneous communications links is non-identical.

40. A computer readable medium as claimed in claim 39, wherein the terminal comprises a sectored multiple beam antenna, and the program code further comprises:

code to direct a sector or a beam to one of the plurality of base stations for providing a near-isolated communications link to the one of the plurality of base stations.

41. A computer readable medium as claimed in claim 39, the program code further comprising:

code to communicate the content data via the number of the plurality of communications links, a proportion of the data being communicated over a communications link of the number of the plurality of communications links and another proportion of the data being simultaneously communicated over another communications link of the number of the plurality of communications links.

42. A computer readable medium as claimed in claim 41, the program code further comprising code to enable a source of the content data controls routing of virtual circuits so as to cause the proportion of the content data to be communicated over the communications link of the number of the plurality of the communications links.

43. A computer readable medium as claimed in claim 41, the program code further comprising:

code to edit headers of data units to contain an address corresponding to the communications link of the number of the plurality of the communications links.

44. A computer readable medium as claimed in claim 41, the program code further comprising:

code to edit path identifiers of data units so that the proportion of the data is communicated over the communications link of the number of the plurality of communications links.

45. A computer readable medium as claimed in claim 39, the program code further comprising:

code to select the number of the plurality of communications links from the plurality of communications links in response to respective signal quality criteria of the plurality of communications links.

46. A computer readable medium as claimed in claim 45, the program code further comprising:

code to select the number of the plurality of communications links from the plurality of communications links in response to respective bandwidth availability of the plurality of communications links.

* * * * *